(12) United States Patent
Zdepski et al.

(10) Patent No.: US 6,606,746 B1
(45) Date of Patent: Aug. 12, 2003

(54) INTERACTIVE TELEVISION SYSTEM AND METHOD FOR DISPLAYING A GRAPHICAL USER INTERFACE USING INSERT PICTURES

(75) Inventors: Joel W. Zdepski, Mountain View, CA (US); Rama M. Kalluri, Los Altos, CA (US)

(73) Assignee: OpenTV, Inc., San Francisco, CA (US)

( * ) Notice: Subject to any disclaimer, the term of this patent is extended or adjusted under 35 U.S.C. 154(b) by 0 days.

(21) Appl. No.: 09/098,941

(22) Filed: Jun. 17, 1998

Related U.S. Application Data

(63) Continuation of application No. 08/951,795, filed on Oct. 16, 1997.

(51) Int. Cl.[7] .......................... G06F 3/00; H04N 5/262
(52) U.S. Cl. ..................................... 725/37; 375/240.26
(58) Field of Search ......................... 725/105, 37, 47, 725/60, 61, 135, 136; 348/563, 561, 564, 473, 589, 586, 598; 369/100; 345/326, 424, 700, 629, 632, 634, 719, 722, 764, 781, 806; 375/240.26; 382/232–253

(56) References Cited

U.S. PATENT DOCUMENTS

| | | | |
|---|---|---|---|
| 5,422,674 A | | 6/1995 | Hooper et al. |
| 5,594,507 A | * | 1/1997 | Hoarty ..................... 348/584 |
| 5,673,401 A | * | 9/1997 | Volk et al. .................. 725/139 |
| 5,682,511 A | * | 10/1997 | Sposato et al. ............. 345/716 |
| 5,867,208 A | * | 2/1999 | McLaren .................... 725/139 |

FOREIGN PATENT DOCUMENTS

| | | |
|---|---|---|
| WO | 95/33342 | 12/1995 |
| WO | 96/34466 | 10/1996 |
| WO | 96/37074 | 11/1996 |
| WO | 96/38008 | 11/1996 |

OTHER PUBLICATIONS http://www.ebopedia.com/TERM/p/paste.html.*
http://www.rasip.fer.hr/research/compress/algorithms/adv/bmp/.*
International Search Report, Application No. PCT/US99/13030, mailed Sep. 28, 1999.

* cited by examiner

*Primary Examiner*—Andrew Faile
*Assistant Examiner*—Hunter Lonsberry
(74) *Attorney, Agent, or Firm*—Meyertons, Hood, Kivlin, Kowert & Goetzel, PC; Rory D. Rankin; Jeffrey C. Hood

(57) ABSTRACT

A system and method for providing a graphical user interface (GUI) in an interactive television system. In the preferred embodiment, the interactive television system comprises a video delivery system for providing video content, and at least one subscriber television including a display screen, wherein the subscriber television is coupled to the video delivery system. According to the present invention, the video delivery system provides a compressed background picture and one or more compressed insert pictures. Each of the compressed insert pictures represents a display portion of the GUI. The subscriber television receives the compressed background picture and the one or more compressed insert pictures, and operates to paste at least one of the compressed insert pictures into the compressed background picture. The pasting is preferably performed in response to interactive program execution and/or user input. The subscriber television then decodes the compressed background picture including the at least one compressed insert picture and displays the background picture with the at least one insert picture incorporated into the background picture, wherein this displaying operates to display the GUI.

32 Claims, 16 Drawing Sheets

INTERACTIVE TELEVISION SYSTEM AND METHOD FOR DISPLAYING A GRAPHICAL USER INTERFACE USING INSERT PICTURES

CONTINUATION DATA

This is a continuation in part of application Ser. No. 08/951,795 titled "Interactive Television System and Method for Inserting Pictures within Pictures using MPEG I Frames" and filed Oct. 16, 1997 abandoned whose inventors are Joel Walter Zdepski and Rama Murty Kalluri.

FIELD OF THE INVENTION

The present invention is related to interactive video delivery mediums such as interactive television, and more particularly to a system and method for inserting pictures within a background picture in an interactive television application to simulate user interface features on the television display.

DESCRIPTION OF THE RELATED ART

Interactive television is an interactive audio/video delivery medium which provides broadcast audiovisual content to a number of subscribers. Interactive television provides broadcast video and audio to users and also provides a return path for the user to interact with the content, e.g., to make selections or order desired products, etc.

Currently, many interactive television applications display a still background using an encoded bit stream, such as an MPEG-2 encoded bit stream, and some overlayed information. In general, the still background bitstream and the overlayed information bit stream are not edited by the interactive television application or any other subsystem prior to the decoding. However, it would be greatly desirable for the interactive application executing on the set top box decoder to be able to edit the still background and overlayed information prior to decoding and display. U.S. patent application Ser. No. 08/951,795 titled "Interactive Television System and Method for Inserting Pictures within Pictures using MPEG I Frames" and filed Oct. 16, 1997 whose inventors are Joel Walter Zdepski and Rama Murty Kalluri, discloses a system and method for displaying a picture with an insert picture in a video system, such as an interactive television system. The above-referenced patent application allows, for example, a still image background, such as a web page, downloaded to an interactive receiver decoder (IRD) or set top box to contain an area into which it is desired to patch a related or unrelated image or video sequence. As a result, the contents of this insert area being patched into the background image can be programmatically selected/edited and/or can be selected/edited by a viewer based on user input, e.g., from a list of choices made available to him/her.

The picture in picture feature of the above-referenced patent application can be used for a number of different applications. In particular, it would be desirable to provide enhanced graphical user interface features in an interactive television system

MPEG Background

Background on MPEG compression is deemed appropriate. MPEG (Moving Pictures Experts Group) compression is a set of methods for compression and decompression of full motion video images which uses interframe and intraframe compression techniques. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

An MPEG stream includes three types of pictures, referred to as the Intra (I) frame, the Predicted (P) frame, and the Bi-directional Interpolated (B) frame. The I or Intra frames contain the video data for the entire frame of video and are typically placed every 10 to 15 frames. Intra frames provide entry points into the file for random access, and are generally only moderately compressed. Predicted frames are encoded with reference to a past frame, i.e., a prior Intra frame or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

An MPEG encoder divides respective frames into a grid of 16×16 pixel squares called macroblocks. The respective frames are divided into macroblocks in order to perform motion estimation/compensation. Each picture is comprised of a plurality of slices. The MPEG standard defines a slice as a contiguous sequence of 2 or more macroblocks (16×16 pixel blocks) that begin and end on the same row of macroblocks. A slice begins with a slice start code and includes information indicating the horizontal and vertical location where the slice begins in the picture.

SUMMARY OF THE INVENTION

The present invention comprises a system and method for providing a graphical user interface (GUI) in an interactive television system, wherein the interactive television system comprises a video delivery system for providing video content, and at least one subscriber television including a display screen, wherein the subscriber television is coupled to the video delivery system. This enables a user to interact with a GUI presented on the screen of a television in an interactive television system.

According to the present invention, the video delivery system provides a compressed background picture and one or more compressed insert pictures. Each of the compressed insert pictures represents a display portion of the GUI. The subscriber television receives the compressed background picture and the one or more compressed insert pictures, and operates to paste at least one of the compressed insert pictures into the compressed background picture. The pasting is preferably performed in response to interactive program execution and/or user input. The subscriber television then decodes the compressed background picture including the at least one compressed insert picture and displays the background picture with the at least one insert picture incorporated into the background picture, wherein this displaying operates to display the GUI.

In the preferred embodiment, the compressed background picture comprises a plurality of slices, wherein the plurality of slices include one or more replacement slices. The compressed insert picture comprises one or more slices. The compressed background picture is created with a slice structure wherein the replacement slices are placed in a position where the insert picture is desired to appear. The replacement slices in the compressed background picture are adapted to be replaced with the one or more slices comprising the compressed insert picture. The compressed insert picture slices preferably include position data indicating the location in the background picture where they are to appear.

The subscriber television receives the compressed background picture and the compressed insert picture and operates to paste the compressed insert picture into the compressed background picture. The pasting operation preferably comprises replacing the replacement slices in the compressed background picture with the slices comprising the compressed insert picture. More specifically, the pasting operation preferably comprises providing the compressed insert picture slices for decoding in place of the replacement slices in the compressed background picture. In other words, the method provides interspersed slices from the compressed background picture and the compressed insert picture for decoding, wherein the slices are interspersed to accomplish replacement of the replacement slices with the compressed insert picture slices.

The video delivery system also preferably provides a background picture slice map indicating a location of the replacement slices comprised in the compressed background picture, and further provides an insert picture slice map indicating byte offsets of the insert picture slices. The subscriber television receives the background picture slice map and the insert picture slice map and uses these maps to paste the compressed insert picture slices into the compressed background picture slices.

The subscriber television includes a decoder which decodes the compressed background picture including the compressed insert picture. The resulting video signal, which comprises the background picture with the insert picture incorporated into the background picture, is then displayed.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

Incorporation by Reference

U.S. patent application Ser. No. 08/951,795 titled "Interactive Television System and Method for Inserting Pictures within Pictures using MPEG I Frames" and filed Oct. 16, 1997 whose inventors are Joel Walter Zdepski and Rama Murty Kalluri is hereby incorporated by reference as though fully and completely set forth herein.

The present invention comprises a system and method for displaying a graphical user interface (GUI), and/or simulating a GUI, on a display screen, such as a television screen in an interactive television system. In the preferred embodiment, the system and method is comprised in an interactive television system. However, it is noted that the present invention may be included in any of various types of video systems, including standard television, interactive television, the Internet, and other types of video or graphics delivery mediums. The term "video" as used herein is intended to include still images, graphics, and live action or motion video.

The preferred embodiment of the present invention utilizes a system and method for displaying a picture with one or more insert pictures in a video delivery system, which is described in the above-referenced patent application.

Interactive Television System

Figure 1:
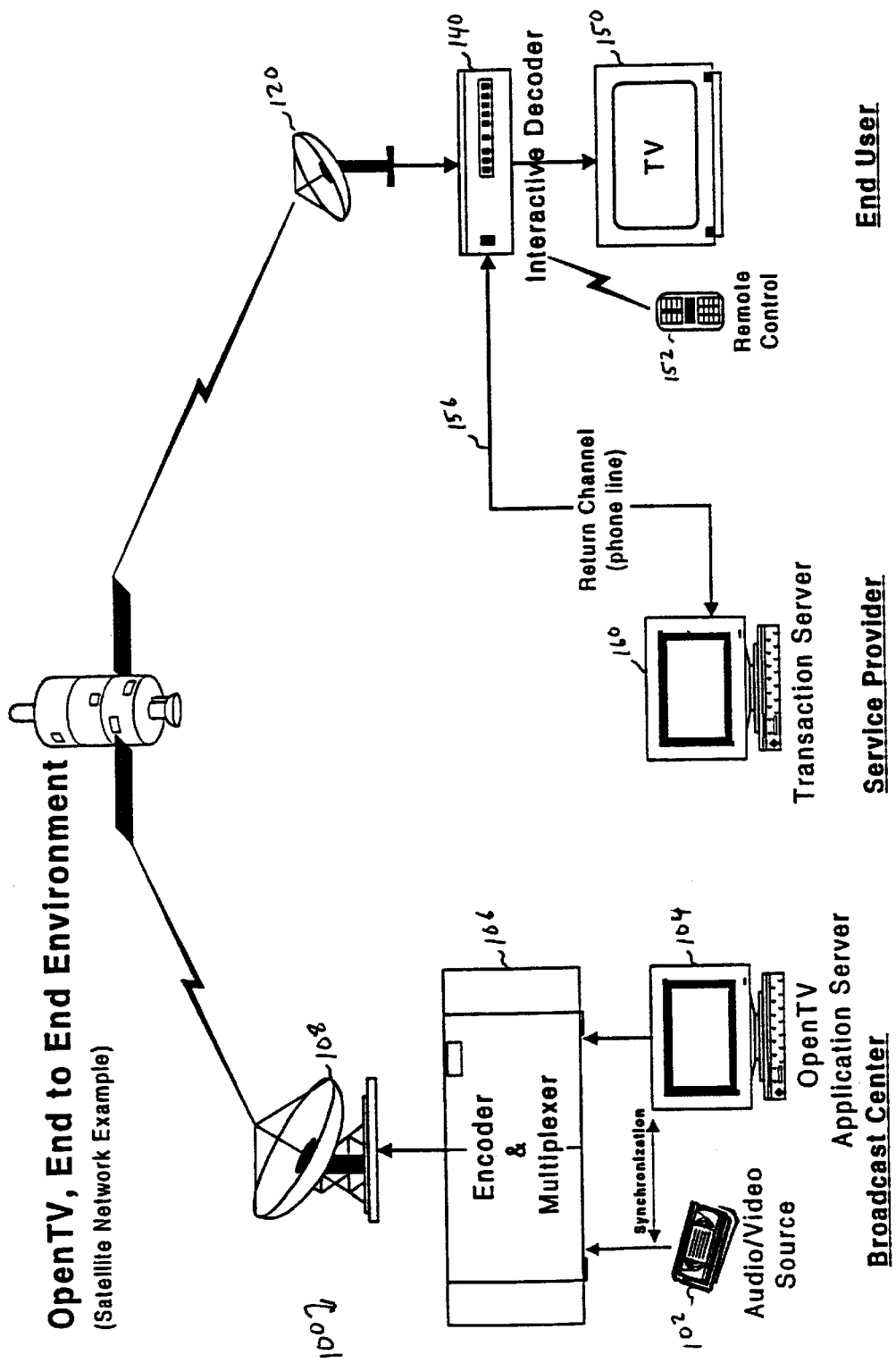
FIGS. 1 illustrates an interactive television system according to the present invention.

Referring now to FIG. 1, a block diagram of an interactive television system according to one embodiment of the present invention is shown. It is noted that FIG. 1 is illustrative only, and other interactive television system embodiments may be used, as desired.

As shown, the interactive television system employs a broadcast center 100 for generating audiovisual content, including interactive audiovisual content. The broadcast center 100 includes an audio/video source 102 for providing the audiovisual content. The audiovisual content may comprise movies, sports, news, sitcoms or other audiovisual programming, as is normally seen on television. The audiovisual content also preferably comprises still images which may be used for various purposes. The audiovisual content preferably includes background pictures or images, as well as insert pictures or overlays which are designed to be overlaid on the background picture. The background pictures and insert pictures may comprise still images or portions of a motion video sequence, as desired.

According to the present invention, the insert pictures comprise images or pictures representing portions of a graphical user interface (GUI), referred to as a display portion of the GUI. In the present description, the phrase a "display portion of the GUI" is intended to refer to a portion or all of the displayable element of a GUI, such as buttons, dials, knobs, slider bars, text boxes, switches, numeric values, graphs, charts or other types of GUI elements or controls/indicators, which form part or all of a user interface. It is also noted that the "display portion of the GUI" is also intended to include both GUI input elements, for receiving input from a user, and GUI output elements, for displaying information to a user.

The phrase a "display portion of the GUI" is also intended to refer to images or pictures of the above GUI elements in various different states, such as images or pictures of buttons, switches, etc. in various different states, e.g., on/off. For example, a first one of the compressed insert pictures may comprise a picture depicting an unpressed button, and a second one of the compressed insert pictures may comprise a picture depicting a pressed button.

Figure 2:
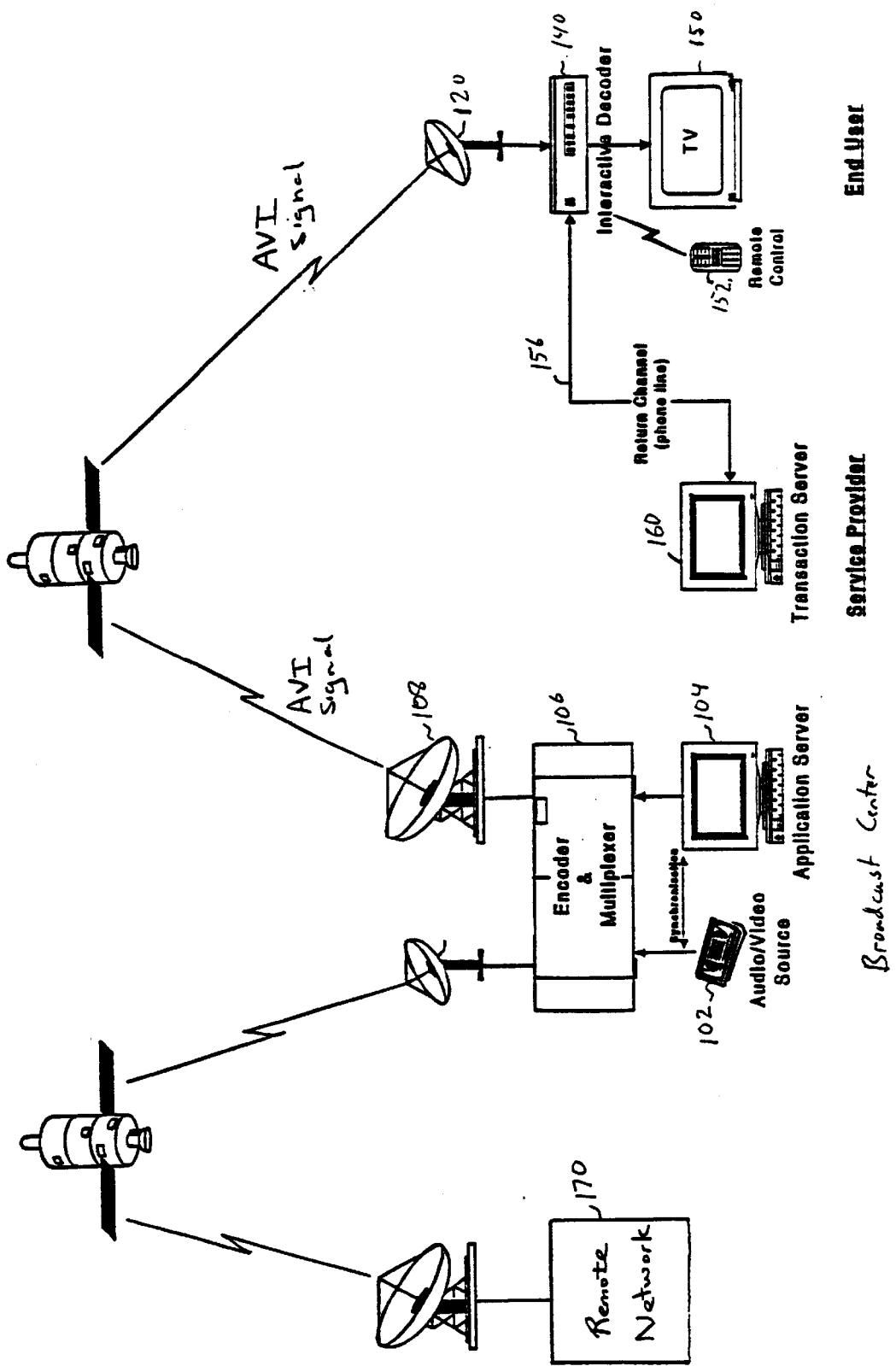
FIG. 2 illustrates the interactive television system of FIG. 1 which includes a remote network that provides programming content.

The audio/video source 102 may include video compression logic for compressing still video images into compressed still video images. As shown in the alternative embodiment of FIG. 2, the audiovisual content may also be supplied by a remote network 170 or a live feed, as desired.

The broadcast center 100 also includes an application server 104 for creating and/or generating interactive application content. The interactive application content comprises application code and data which is designed to be executed by a processor within a set top box or television to support an interactive television feature. The application server 104 is preferably configured for generating or providing "OpenTV" interactive applications. The application server may also provide "Java" applets or other interactive program content, as desired.

An Encoder/Multiplexer 106 combines the interactive application content with the audiovisual content to produce an audio-video-interactive (AVI) signal. The Encoder/Multiplexer 106 also synchronizes the interactive application content with the audiovisual content to ensure that the interactive application content is inserted in the proper position within the audiovisual content. It is noted that certain channels may comprise non-interactive programming content. In other words, certain audiovisual content may not have associated interactive content. The Encoder/Multiplexer 106 preferably multiplexes a plurality of signals, including AVI signals and optionally non-interactive signals, together for transmission.

The broadcast center 100 also includes an uplink satellite 108 for transmitting the broadcast signal for receipt by end-users or a subsequent distribution link. It is noted that FIG. 1 illustrates a satellite network example where a satellite is used to transmit the broadcast signal. However, it is noted that other transmission methods may be used, including cable distribution through coaxial cable, fiber optic transmission, microwave transmission or other means.

The broadcast signal is received from broadcast center 100 via a satellite downlink 120. The broadcast signal is then provided to a plurality of subscribers. As noted above, the broadcast signal includes one or more AVI signals on respective channels, and may include one or more non-interactive program signals.

As shown, each end user or subscriber preferably includes a set top box or interactive decoder 140 as well as a television set 150. The set top box or interactive decoder 140 is coupled to the television set 150. It is noted that the interactive decoder logic may be comprised in the television 150 instead of being comprised as a separate unit 140. Also, the television may comprise a general purpose programmable computer having a display screen, or other viewing device, as desired.

In the present disclosure, the term "subscriber television" is intended to include the television set 150 or other viewing device, such as a computer, LCD (liquid crystal display) screen, etc., and may include associated decoder logic for decoding compressed video and/or executing interactive programs. For example, in one embodiment, the subscriber television comprises the television set 150 coupled with the interactive decoder or set top box 140.

The television 150 includes a remote control 152 which facilitates user interaction with the television 150 and/or interactive decoder 140. The user can select desired television channels for viewing or provide various interactive selections. According to the present invention, the user can interact with the GUI displayed on the television screen to interact with or control an interactive application executing on the subscriber television, or to control other functions associated with the subscriber television, such as channel selection, volume, etc. The user can also selectively configure a graphical user interface (GUI) on the display screen using the present invention.

The signal on the selected television channel is decoded by the interactive decoder 140 which provides an output to the television set 150. The interactive decoder 140 preferably executes a real time operating system, such as OpenTV from OpenTV, Inc. Where the channel being viewed comprises an AVI signal, the interactive decoder 140 also executes an interactive application program conveyed within the selected AVI signal to enable an interactive television feature.

A return channel 156 interconnects the interactive decoder 140 to a transaction server 160, which monitors certain selections by the user and responds accordingly, as desired. The return channel 156 preferably utilizes a standard POTS (plain old telephone system) phone line and associated modems (not shown) for communication. Other return channel options, such as coaxial cable, fiber optic cable, DSL (Digital Subscriber Line), ATM (Asynchronous Transfer Mode), or others, may be used, as desired.

The broadcast center 100 provides a plurality of program channels each comprising audiovisual content. One or more program channels comprise AVI signals including audiovisual content and associated interactive applications. According to the preferred embodiment of the present invention, the encoder 106 at the broadcast center 100 is operable to transmit compressed background pictures and compressed insert pictures. The encoder 106 encodes the background pictures with the necessary slice structure for insertion of the insert pictures. The encoder 106 is also operable to transmit slice maps to assist in the insertion.

In the preferred embodiment, at least a subset of the interactive applications provided on one or more AVI signals are executable to insert a respective insert picture into a background picture. The interactive application preferably operates to insert a selected insert picture from a plurality of possible insert pictures to display or simulate the GUI. The insert pictures are preferably selected by the interactive application, and preferably are also selected based on user input or user interaction with the GUI. In another embodiment, the logic and/or software which operates to insert a respective insert picture into a background picture resides permanently on the set top box 140.

The GUI created according to the present invention may be used for or in a number of different interactive television applications. Examples of these interactive television applications include game shows, advertising, video-on-demand, and others.

Figure 3:
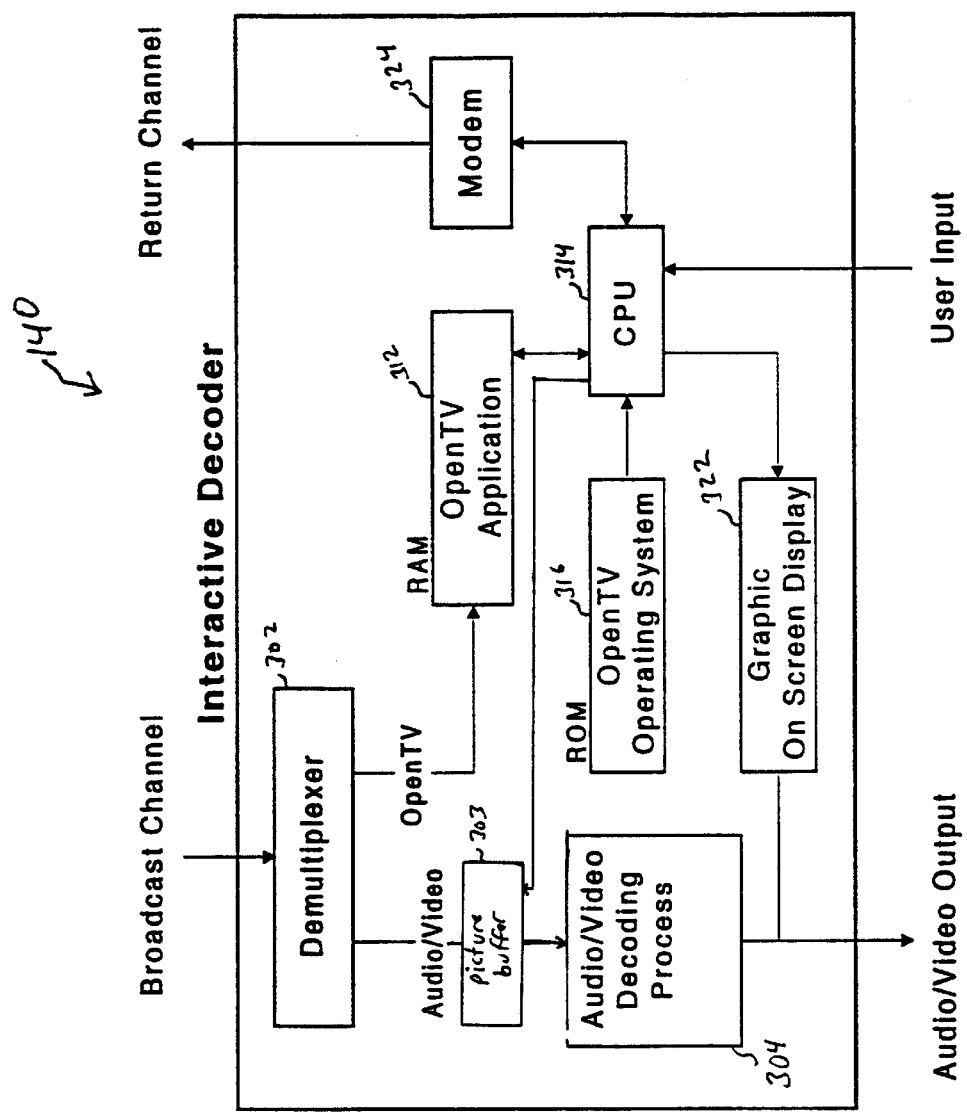
FIG. 3 is a block diagram of the interactive decoder of FIGS. 1 and 2.

FIG. 3—Interactive Decoder

Referring now to FIG. 3, a block diagram illustrating the set top box or interactive decoder 140 is shown. As shown, the interactive decoder 140 includes an input for receiving a broadcast signal over a channel. The broadcast signal preferably comprises a plurality of channels comprising programming content, such as movies, sports, television shows, news, advertising, etc. At least a subset, i.e., one or more, of the program channels comprises an AVI (audio video interactive) signal which comprises an audiovisual component as well as an interactive program component as described above. The audiovisual component is preferably compressed, preferably MPEG compressed. The broadcast signal, preferably the interactive program content, includes one or more compressed background pictures and compressed insert pictures, and preferably includes associated slice map information.

The broadcast channel signal is provided to a demultiplexer 302 in the interactive decoder 140. The demultiplexer 302 operates to separate the audio/video component from the interactive component. In the preferred embodiment of the invention, the interactive component comprises an interactive application and/or data which is compliant with the OpenTV standard promulgated by OpenTV, Inc. However, it is noted that other types of interactive applications may be included in the AVI signal, as desired.

The demultiplexer 302 provides the audio/video component to an audio/video decoding block 304. The decoding block 304 operates to decode the compressed audiovisual data stream to produce decompressed data. In the preferred embodiment, the broadcast channel transports MPEG-2 compressed data. Thus, in the preferred embodiment, the decoding process block 304 preferably includes an MPEG-2 decoder for decompressing or decoding the encoded data. The decoder 304 preferably includes one or more DSPs and one or more associated memories. It is noted that the decoder may comprise various types of logic, including one or more DSPs, CPUs, or microcontrollers, discrete logic, or combinations thereof.

The decoding process block 304 provides an audio/video output which is preferably provided to the television 150 for display. When the decoding block 304 receives interspersed slices from a compressed background picture and one or more compressed insert pictures, the decoder outputs a still image comprising the background picture with one or more insert pictures incorporated into the background picture.

The interactive decoder 140 includes a memory 316, preferably a read only memory (ROM), which stores the interactive application operating system. The operating system is preferably the OpenTV operating system from OpenTV, Inc. A CPU 314 is coupled to the ROM 316.

The interactive program component which is provided by the output of the demultiplexer 302 is provided to a memory 312, preferably a random access memory (RAM), which stores the interactive application, i.e., the OpenTV application. The CPU 314 is coupled to the interactive application RAM 312. Thus, the interactive application from the AVI signal is stored in the RAM 312, and the CPU 314 can read the application from the RAM 312 and execute the application. In the preferred embodiment, the interactive application executes to present and/or control the display of the GUI on the television screen, using the received insert pictures.

Thus, the CPU 314 reads the OpenTV operating system from the ROM 316, whereby the operating system controls the operation of the CPU 314. The CPU 314 also reads the interactive application from the RAM 312, which was provided with the AVI signal, and executes this interactive application under control of the OpenTV operating system stored in ROM 316.

In the preferred embodiment, the compressed background and insert pictures are comprised in the interactive application. Thus, in this embodiment, the compressed background and insert pictures are included as part of the interactive application, and not as part of the audiovisual component. The compressed background and insert pictures are thus received by the demultiplexer 302 and then temporarily stored in the RAM 312.

As discussed further below, the interactive component preferably also includes at least one slice map to assist in insertion of insert pictures into background pictures. In other words, the video delivery system preferably provides slice maps with the compressed background picture and compressed insert picture to aid in incorporating or pasting the insert picture into the background picture. The interactive component preferably includes a background picture slice map and an insert picture slice map to assist in insertion of insert pictures into background pictures.

The RAM 312 includes an output coupled to the decoder 304, as shown. The CPU 314 controls the output from the RAM 312 to provide MPEG slices to the decoder 304. More specifically, the CPU 314 directs the RAM 312 to provide slices from the compressed background and insert pictures to the decoder 304 to accomplish pasting of the compressed insert picture into the compressed background picture according to the present invention. The CPU 314 preferably executes the interactive application and uses the slice maps stored in the RAM 312 to provide the slices to the decoder 304 in the proper order for pasting.

As discussed further below, pasting of the compressed insert picture into the compressed background picture comprises replacing one or more slices, referred to as replacement slices, in the compressed background picture with the one or more slices comprising the compressed insert picture. More specifically, pasting of the compressed insert picture into the compressed background picture comprises the CPU 314 directing the RAM 312 to provide slices from the compressed insert picture for decoding in place of the replacement slices in the compressed background picture. Stated another way, the CPU 314 preferably directs the RAM 312 to provide interspersed slices from the background picture and the insert picture for decoding, wherein the slices from the compressed background and insert pictures are interspersed in an order to accomplish replacement of the one or more replacement slices in the compressed background picture with the one or more slices comprising the compressed insert picture.

In one embodiment, the CPU 314 provides an output to a graphic on-screen display block 322. The graphic on-screen display block 322 is coupled to provide an output in conjunction with the audio/video output provided by decoder 304. The graphic on-screen display block 322 organizes data in a format which can be overlaid on top of the audio/video output of the decoder 304. Thus, the CPU 314 executes an interactive application and generates on-screen graphics which are provided in conjunction with the audio/video stream being output from the decoder 140. Thus, for example, if the interactive application is written to cause one or more images or selection options to be displayed or overlaid on top of a television program or still image, the CPU 314 executing the application provides the appropriate output to the graphic on-screen display block 322, and the block 322 causes the respective images or selection buttons to be overlaid on top of and/or displayed with the audio/ video output of the decoder 304

The graphic on-screen display block 322 thus may be included to provide another means to overlay or insert a picture or image onto a still image or video sequence. The graphic on-screen display block 322 is preferably only 2-bit or 4-bit color memory for cost reasons. The graphic on-screen display block 322 may be used for various purposes. For example, the graphic on-screen display block 322 may be used to highlight insert pictures, such as buttons, text, etc. that are inserted using the system and method of the present invention.

The interactive decoder 140 also includes an input for receiving user input. This user input is provided to an input of the CPU 314. This user input may be provided from various devices, preferably from remote control 152 or from buttons on the TV 150 or the interactive decoder 140. The user input provided to the CPU 314 enables a user to interact with the GUI presented on the screen. Using the GUI, the user can interact with the interactive application. For example, the user or viewer may choose a selection or button to order a product or order information, provide answers to a television game show, etc. The user or viewer may select an insert picture or insert feed from a choice of insert pictures or feeds, wherein the selected insert picture is for display in a background picture according to the present invention. Also, the user or viewer may select a location of an insert picture in a background picture.

The interactive decoder 140 also includes a modem 324 which provides information on the return channel 156 for user interactivity. As shown in FIG. 3, the CPU 314 is coupled to the modem 324, and the modem 324 is coupled to a return channel output of the interactive decoder 140. In the embodiment shown in FIG. 3, the modem 324 may be used for bidirectional communication. As shown in FIG. 1, the return channel 156 preferably couples to a transaction server 160. Thus, if the user selects an option to order information, or purchase a product, the transaction server 160 receives this order and processes the order for fulfillment. Also, if the user answers questions in a game show, the answers are provided on the return channel 156 to the transaction server 160. It is noted that various different types of return channels may be used, including ISDN, DSL (digital subscriber line), fiber optic cable, or other wired or wireless means.

Figure 3A:
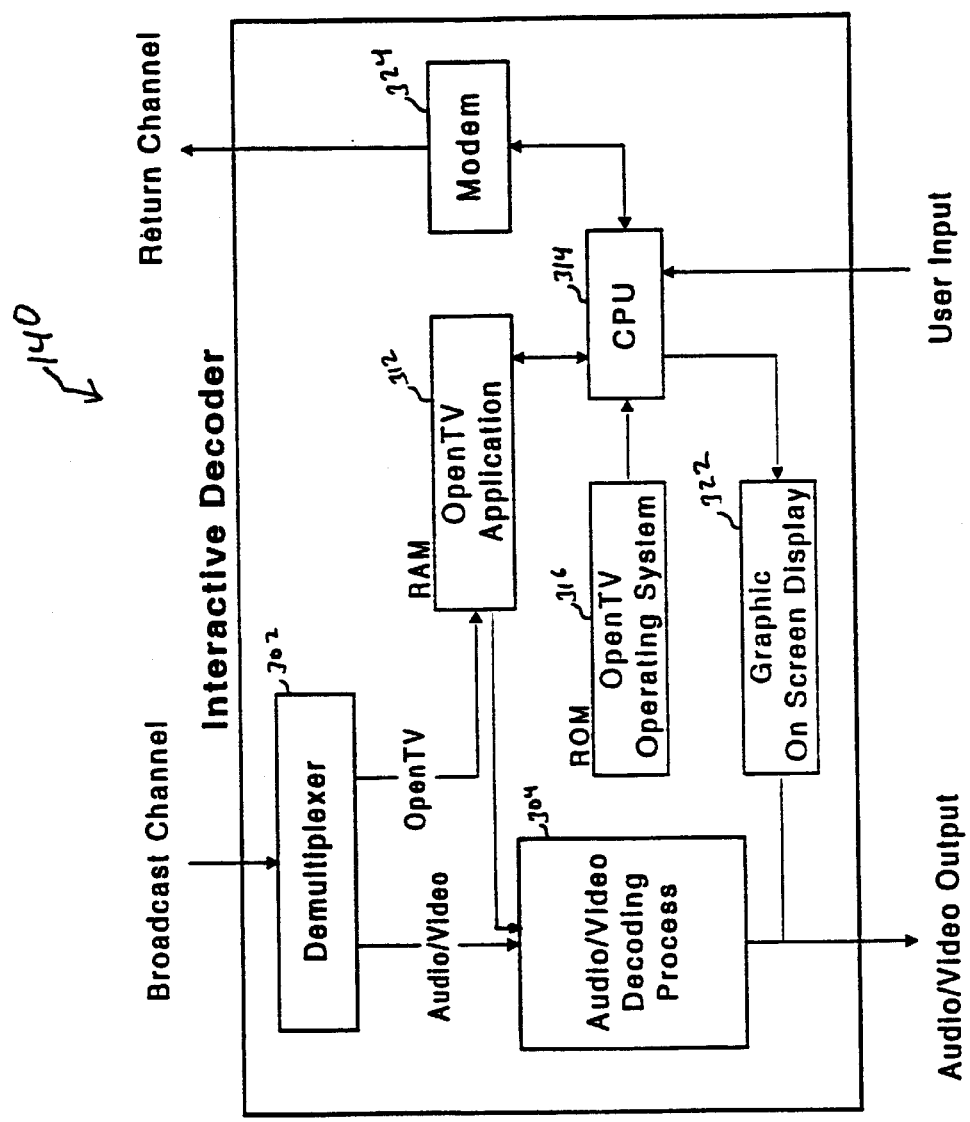
FIG. 3A is an alternate embodiment of the interactive decoder of FIG. 3.

FIG. 3A—Interactive Decoder Alternate Embodiment

Referring now to FIG. 3A, in an alternate embodiment, the compressed background and insert pictures are comprised in the audiovisual content portion of the bitstream. In this embodiment, the set top box or interactive decoder 140 includes a picture buffer or memory 303 coupled between the demultiplexer 302 and the decoder 304. The picture buffer 303 is operable to store portions of a compressed background picture and/or compressed insert picture to facilitate providing slices to the decoder 304 in order to accomplish pasting of an insert picture into a background picture. In other words, the picture buffer 303 facilitates providing interspersed slices from the compressed background picture and compressed insert picture to accomplish pasting of the insert picture into the background picture.

In this embodiment, the CPU 314 provides an output to the buffer 303, as shown. The CPU 314 uses the output to control the provision of MPEG slices to the decoder 304. In other words, the CPU 314 controls the output of the buffer 303 to accomplish pasting of the compressed insert picture into the compressed background picture, in much the same way that the CPU 314 in FIG. 3 controls the RAM 312 to provide slices to the decoder 304 to accomplish pasting. More specifically, in FIG. 3A, pasting of the compressed insert picture into the compressed background picture comprises the CPU 314 directing the buffer 303 and/or demultiplexer 302 to provide the one or more slices comprising the compressed insert picture for decoding in place of the replacement slices in the compressed background picture.

Insertion of Pictures in a Background Picture

A plurality of methods can be used for inserting a picture into a background picture in an interactive television system. For example, in a first method the encoder preprocesses the background and replaces the appropriate area in the background picture with an insert picture. The edited picture, which now includes the insert, is then encoded as an I picture or I frame and transmitted. This provides a simple mechanism for inserting a picture into a background picture. However, this solution is less than optimal for the interactive television environment, since the insert picture cannot easily be edited.

In a second method, which is one embodiment of the present invention, the encoder compresses both the background and insert pictures as separate I pictures or I frames. The encoder then replaces sections of the background stream with sections from the insert picture. This patched bit stream or picture is then sent to the decoder. This solution is also not optimal for the interactive television environment. However, this method is more flexible than the first method described above, since the background will have the correct slice structure.

In the preferred method of the present invention, the encoder compresses both the background and insert pictures, with the background bit stream having the necessary slice structure. The encoder then transmits both of the compressed bit streams to the decoder. The interactive application executed on the decoder then operates to patch the insert picture into the background picture or bit stream. The encoder also preferably transfers at least one slice map to the decoder to use to assist insertion of the insert picture into the background picture. This method allows the decoder the choice of editing the bit stream at the decoder. This also allows the viewer to have an option of whether to display an insert or a choice of inserts, and also enables the user to optionally select a location in the background picture for display of the insert.

As discussed in the background section, MPEG-2 video bitstreams are generally comprised of some combination of I (Intra-coded) pictures, P (predictively-coded) pictures, and B (Bidirectionally-inerpolated) pictures. Each of the background and insert pictures are comprised of slices. Each background picture comprises a plurality of slices, and each insert picture comprises one or more slices. In the preferred embodiment, only I pictures are used for transmitting background and insert pictures. P and B pictures are preferably not used for transmitting background and insert pictures due to the inherent difficulties of creating these pictures with the proper slice structure.

Figure 4A:
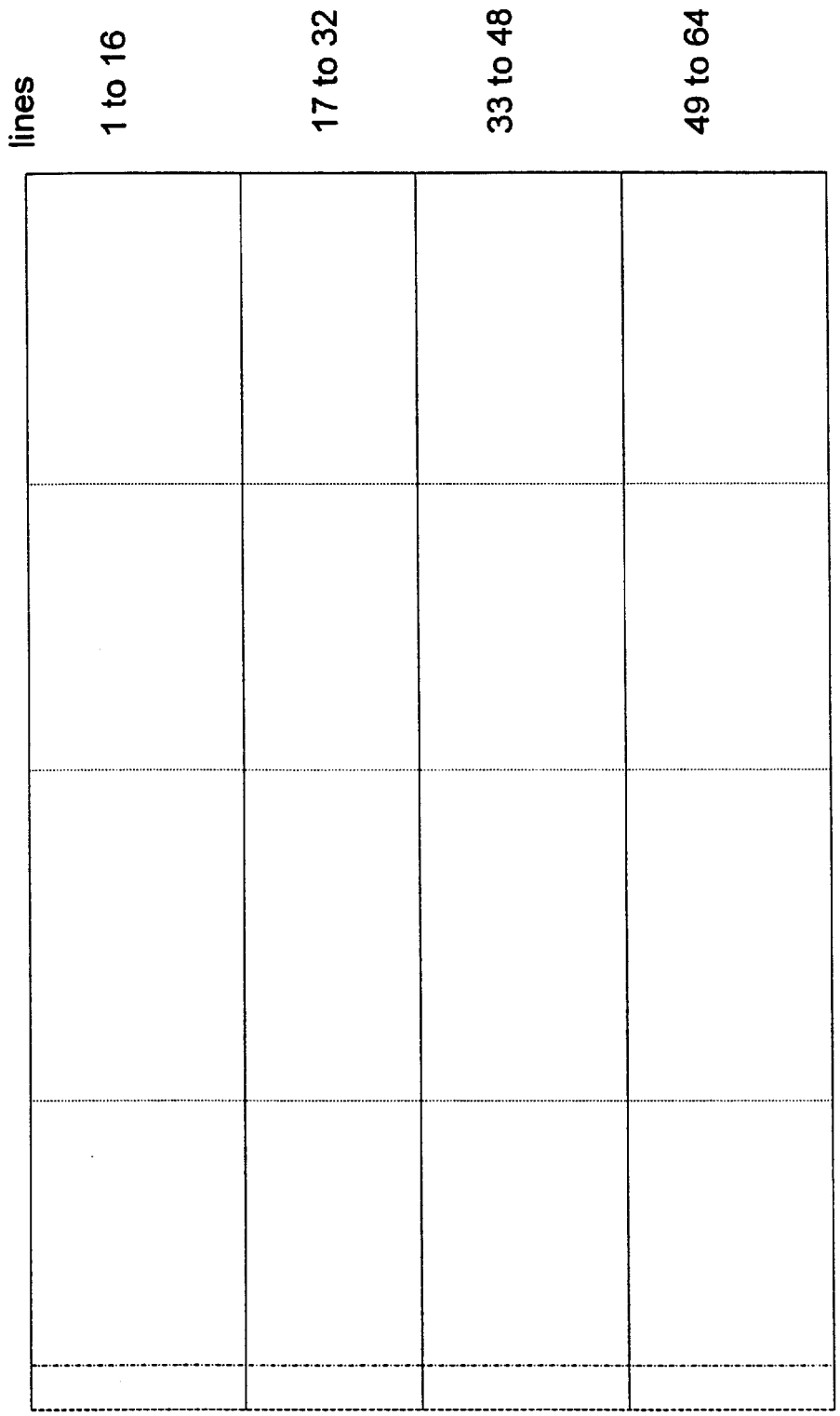
FIG. 4A illustrates a conventional slice structure.

The MPEG-2 standard defines a slice as a contiguous sequence of 2 or more macroblocks (16×16 pixel blocks)

that begin and end on the same row (of macroblocks). The simplest scenario is to encode each row of macroblocks into a slice. For a 64×64 picture, this encoded picture would resemble FIG. 4A. In this example, each row of macroblocks is encoded into a slice.

Figure 4B:
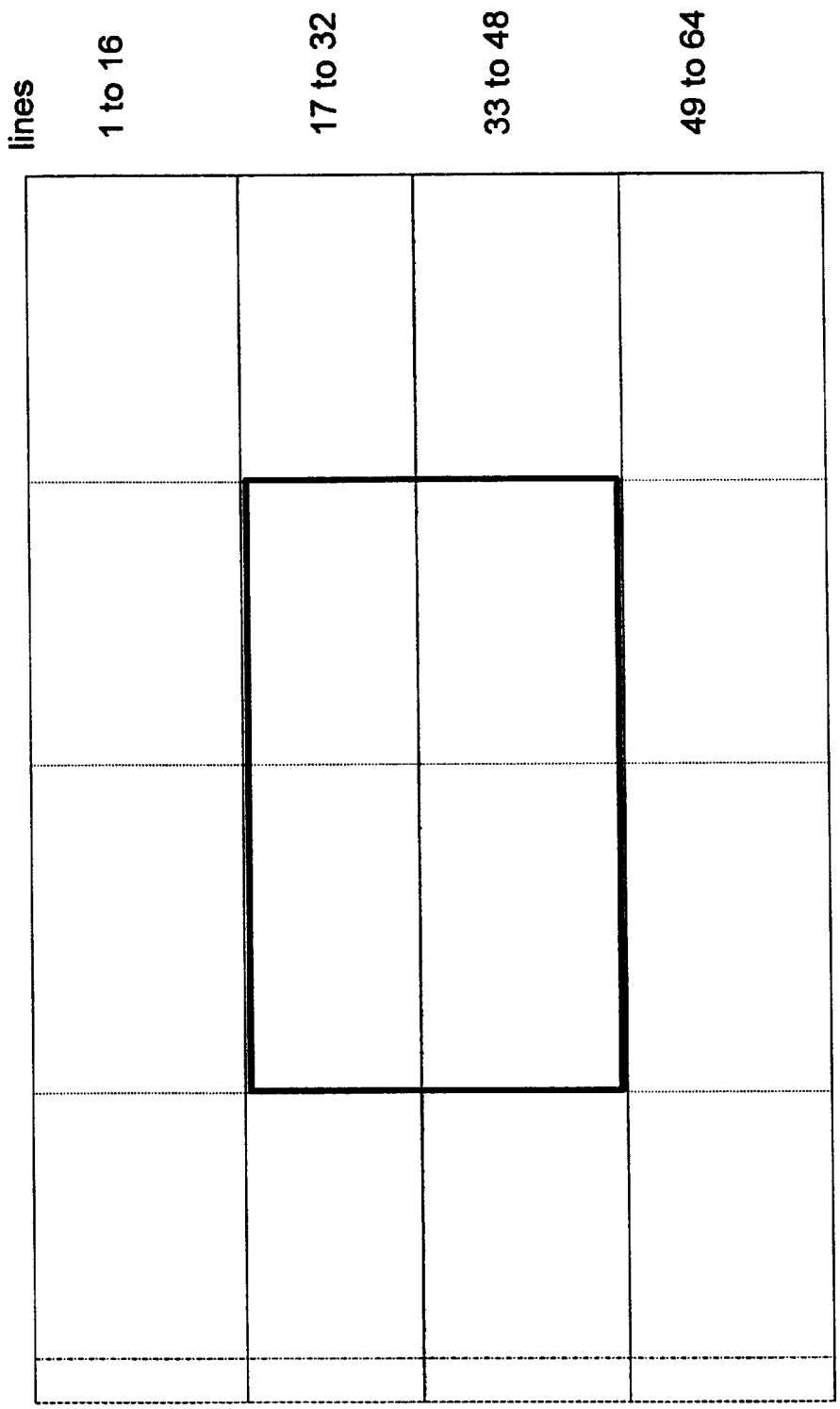
FIG. 4B illustrates a slice structure including one or more replacement slices according to the present invention.

Alternatively, the same picture can be encoded with the slice structure as shown in FIG. 4B. The slice map for this picture is as follows:

| Slice | Row | Start Column | End Column | |
|---|---|---|---|---|
| 1 | 1 | 1 | 4 | Macroblocks 1 to 4 on row #1 |
| 2 | 2 | 1 | 1 | Macroblock 1 on row #2 |
| 3 | 2 | 2 | 3 | Macroblocks 2 and 3 on row #2 |
| 4 | 2 | 4 | 4 | Macroblock 4 on row #2 |
| 5 | 3 | 1 | 1 | Macroblock 1 on row #3 |
| 6 | 3 | 2 | 3 | Macroblocks 2 and 3 on row #3 |
| 7 | 3 | 4 | 4 | Macroblock 4 on row #3 |
| 8 | 4 | 1 | 4 | Macroblocks 1 to 4 on row #4 |

In general, any of the slices in a picture are replaceable by a slice from another bitstream, with the requirement that the new slice contain the same number of macroblocks and start with the same macroblock address increment. In FIG. 4B, the picture includes a slice structure wherein the second and third rows are divided into 3 slices. Thus, a bitstream comprising two slices, with two macroblocks in each slice, can be patched or pasted in place of slices 3 and 6 of FIG. 4B. This creates the appearance of a picture inserted into a background picture. The slices in a background picture which are designed to be replaced by slices of an insert picture are referred to herein as "replacement slices". Thus, in FIG. 4B, for example, slices 3 and 6 comprise replacement slices.

Figure 5:
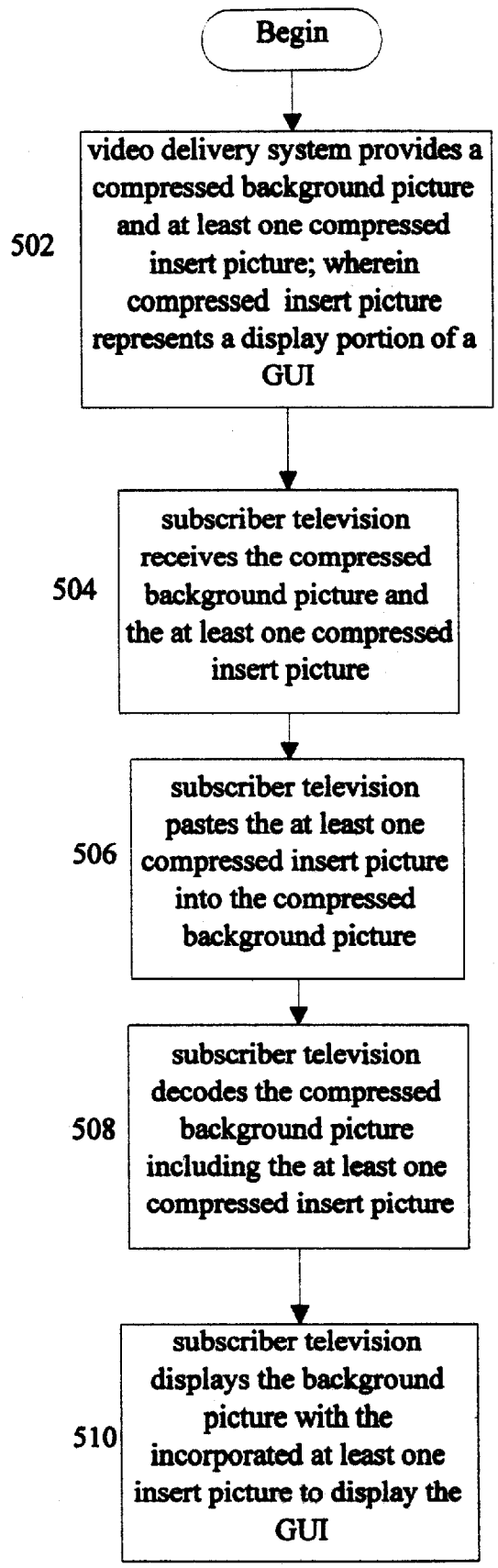
FIG. 5 is a flowchart diagram illustrating operation of the interactive television system of FIGS. 1 and 2 displaying a GUI according to the present invention.

FIG. 5—Operation of the Preferred Embodiment

Referring now to FIG. 5, a flowchart diagram illustrating operation of the preferred embodiment of the present invention is shown. FIG. 5 illustrates the preferred embodiment of pasting insert pictures into background pictures to create or simulate a GUI, it being noted that the present invention may be implemented in various other ways. Although the method is shown in flowchart form, it is noted that certain of the steps may occur concurrently or in different orders.

As discussed above, the present invention includes or utilizes a system and method for displaying a picture with an insert picture in a video delivery system, preferably an interactive television system. The interactive television system comprises a video delivery system for providing video content, and at least one subscriber television including a display screen, wherein the subscriber television is coupled to the video delivery system. The flowchart of FIG. 5 presumes that a compressed background picture and one or more compressed insert pictures have already been created. The flowchart of FIG. 5 also presumes that any desired slice maps have already been created. As shown in FIG. 5, the method preferably operates as follows.

In step 502 the video delivery system provides or broadcasts a compressed background picture and one or more compressed insert pictures. It is noted that the video delivery system will typically generate or broadcast a plurality of compressed background pictures, each with one or more compressed insert pictures. For simplicity, this embodiment is described with reference to one background picture and one insert picture being transmitted. As discussed above, the insert pictures each comprise a display portion of a GUI, or a displayable element of a GUI or user interface.

The compressed background picture comprises a plurality of slices, wherein the plurality of slices include one or more replacement slices. The compressed insert picture comprises one or more slices. As discussed above, the one or more replacement slices in the compressed background picture are configured or adapted to be replaced with the slices comprising the compressed insert picture. Accordingly, the one or more replacement slices are positioned in the compressed background picture where the insert picture is desired to appear.

In the preferred embodiment, the video delivery system also provides a background picture slice map indicating locations of the one or more replacement slices comprised in the compressed background picture. The background picture slice map preferably comprises a list of byte offsets for each of the plurality of slices comprising the compressed background picture. Where the compressed insert picture includes more than one slice, the video delivery system also preferably provides an insert picture slice map indicating byte offsets of the slices comprising the compressed insert picture. As discussed below, the background picture slice map and the insert picture slice map are preferably used to aid in pasting the insert picture into the background picture.

In step 504 the subscriber television receives the compressed background picture and the compressed insert picture. The subscriber television also receives the background picture slice map and the insert picture slice map.

In step 506 the subscriber television pastes the compressed insert picture into the compressed background picture. The pasting operation is preferably performed under the control of an interactive application, preferably executing on the subscriber television, e.g., in the set top box of the subscriber television. The selection of the insert pictures is preferably controlled by the interactive application as well as user input to the GUI which is received by the interactive application. Thus the pasting is performed in response to program execution in the subscriber television and/or in response to user input.

As discussed above, the operation of pasting the compressed insert picture into the compressed background picture preferably comprises replacing the one or more replacement slices in the compressed background picture with the one or more slices comprising the compressed insert picture. In other words, the pasting operation comprises the subscriber television providing the one or more slices comprising the compressed insert picture for decoding in place of the replacement slices in the compressed background picture. The subscriber television thus preferably discards, i.e., does not use, the replacement slices in the compressed background picture.

Stated another way, the operation of pasting the compressed insert picture into the compressed background picture preferably comprises providing interspersed slices from the compressed background picture and the compressed insert picture for decoding. The slices from the compressed insert picture and the compressed background picture are provided in an interspersed fashion to the decoder to accomplish replacement of the one or more replacement slices in the compressed background picture with the one or more slices comprising the compressed insert picture.

Figure 6:
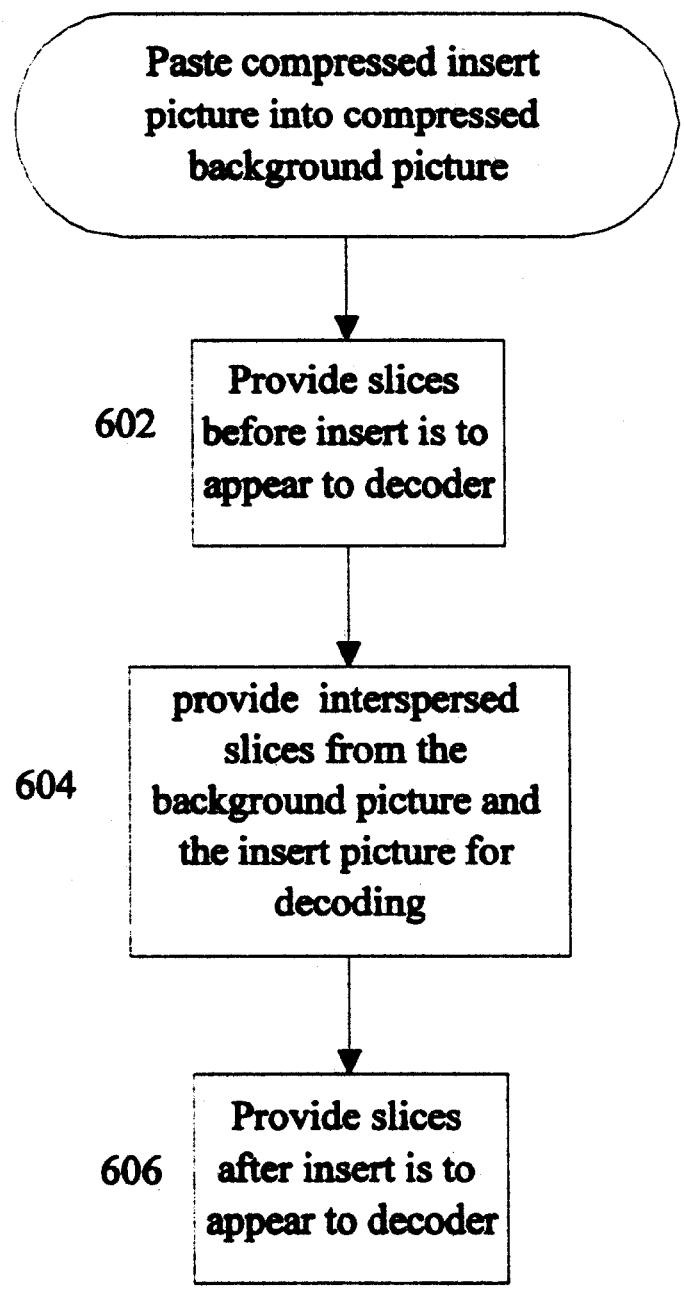
FIG. 6 is a flowchart diagram illustrating the pasting operation performed in step 506 of FIG. 5.

Referring now to FIG. 6, the step of pasting the compressed insert picture into the compressed background picture is shown. As shown, step 506 generally comprises the following steps. First, in step 602, the method provides one or more slices from the compressed background picture for decoding (presuming that the insert picture does not appear in the upper left portion of the background picture). After step 602, in step 604 the method then provides interspersed slices from the compressed background picture and the compressed insert picture for decoding. After step 604, in step 606 the method then finally provides the remaining slices from the compressed background picture for decoding. (presuming that the insert picture does not appear in the lower right portion of the background picture). Obviously, if the insert picture appears in the upper left portion of the background picture, then the interspersed slices from the compressed background picture and the compressed insert picture are provided first for decoding, followed by the remaining slices from the compressed background picture. Similarly, if the insert picture appears in the lower right portion of the background picture, then slices from the compressed background picture are provided first for decoding, followed by the interspersed slices from the compressed background picture and the compressed insert picture.

Referring again to step 506 of FIG. 5, in the preferred embodiment, where the video delivery system provides a background picture slice map and an insert picture slice map, the subscriber television uses the received slice maps to paste the compressed insert picture into the compressed background picture. The subscriber television uses the background picture slice map to determine a location of the replacement slices comprised in the compressed background picture, and uses the insert picture slice map to provide the slices comprising the compressed insert picture in place of the replacement slices. In other words, the subscriber television uses the background picture slice map and the insert picture slice map to properly feed or provide the interspersed slices from the compressed background picture and the compressed insert picture to the decoder for decoding.

As noted above, the background picture slice map and the insert picture slice map preferably comprise listings of byte offsets of the respective slices. These byte offsets are preferably used by the CPU 314 of FIG. 3 to enable the CPU 314 to provide the correct order of background and insert picture slices to the decoder to accomplish the pasting operation.

Where the video delivery system does not provide a background picture slice map and an insert picture slice map, then the subscriber television determines the location of the replacement slices comprised in the compressed background picture prior to the pasting. If slice maps are not provided, the subscriber television is required to scan the compressed background picture and the compressed insert picture to accomplish the pasting. It is noted that, where slice maps are not provided, the pasting operation requires considerably more processing due to the necessity of locating the replacement slices.

The pasting operation of step 506 causes interspersed slices from the compressed background picture and the compressed insert picture to be provided to the decoder 304 for decoding. The slices are interspersed to accomplish replacement of the one or more replacement slices in the compressed background picture with the one or more slices comprising the compressed insert picture.

In response to step 506 being performed, in step 503 the subscriber television, i.e., the decoder 304, decodes the compressed background picture including the compressed insert picture. In other words, in step 508 the decoder 304 decodes the received slices in the order that they are provided to the decoder 304. This results in an output decoded video stream which comprises the background picture with the insert picture incorporated into the background picture. It is noted that portions of step 508 may be performed concurrently with portions of step 506, i.e., slices are generally continually being provided to the decoder 304, and the decoder 304 continually decodes slices as they are received.

In step 510 the subscriber television displays the background picture with the insert picture incorporated into the background picture. Thus, in step 510, the output of the decoder 304 is provided to the display screen for display. This operates to display the GUI on the screen.

It is noted that the above method is easily extended to a plurality of background pictures, with each background picture capable of displaying one or more insert pictures at one or more selectable locations to create any of various types of GUIs.

FIG. 7—User Manipulation of the GUI

Figure 7A:
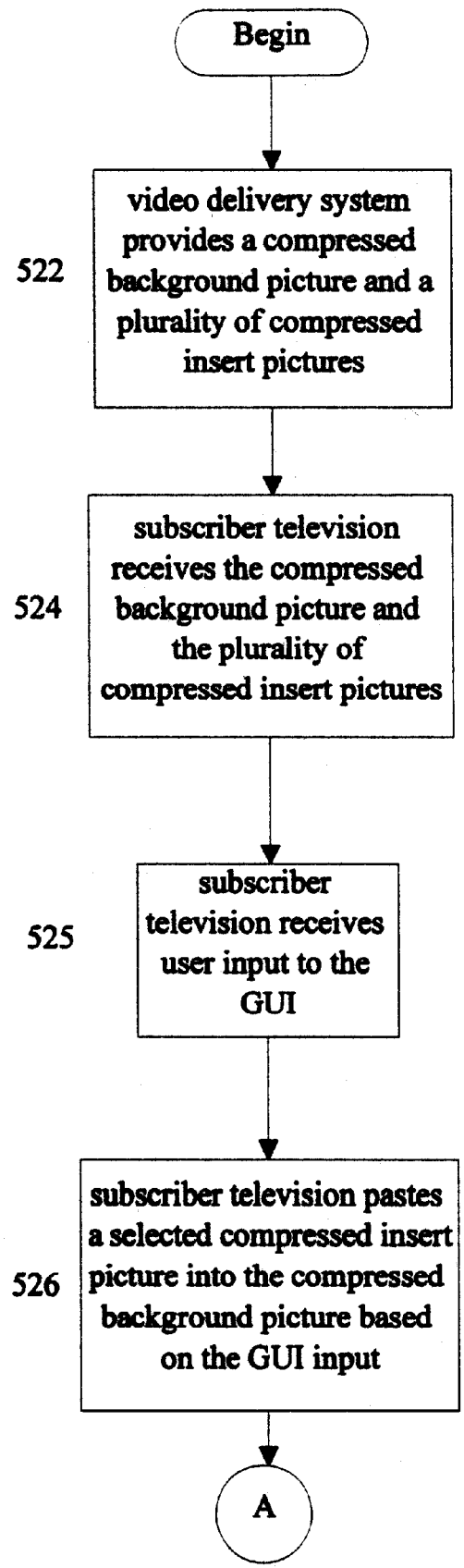
FIGS. 7A and 7B are a flowchart diagram illustrating an embodiment where a plurality of compressed insert pictures are transmitted, and the user provides input to the GUI to select one or more of these for insertion in a background picture.
Figure 7B:
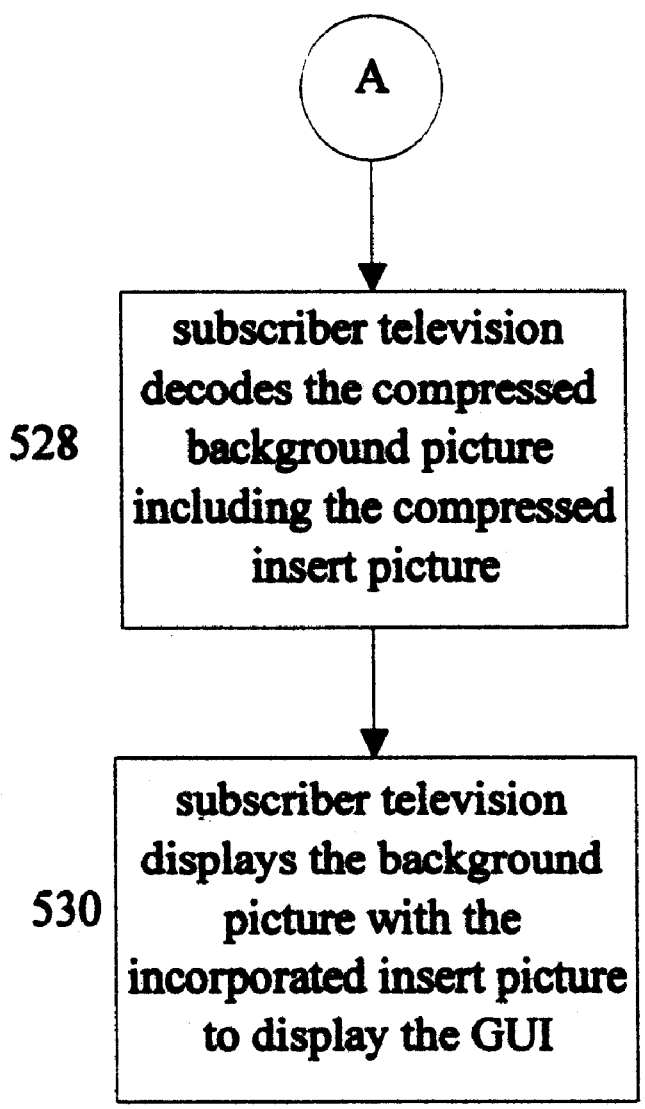

FIGS. 7A and 7B are a flowchart diagram illustrating user manipulation of the GUI. This embodiment is similar to the embodiment of FIG. 5, and illustrates operation when the user or subscriber interacts with GUI, wherein this interaction affects selection of the one or more insert pictures from a plurality of possible insert pictures for display. In this embodiment, the computer system is currently displaying a GUI, and the user provides user input to interact with the GUI.

In this embodiment, in step 522 the video delivery system provides a compressed background picture and a plurality of compressed insert pictures. Each of the plurality of insert pictures is adapted to be displayed in the background picture. Also, each of the plurality of insert pictures comprises a display portion of a GUI. In step 524 the subscriber television receives the compressed background picture and the plurality of compressed insert pictures. It is noted that the compressed background picture and the plurality of compressed insert pictures may have been previously provided when the GUI was originally displayed.

In step 525 the subscriber television receives user input to the GUI displayed on the display screen. The user input is preferably received from a remote control device, touch screen, or other user input device. This received user input operates to aid in selecting one of the plurality of compressed insert pictures for display. For example, if the user presses a button or turns a dial, the subscriber television selects the appropriate insert picture to reflect the action. In step 526 the subscriber television pastes a selected compressed insert picture into the compressed background picture, wherein the insert picture is selected based on the received user input. In step 528 the subscriber television decodes the compressed background picture including the selected compressed insert picture. In step 530 the subscriber television displays the background picture with the selected insert picture incorporated into the background picture after the decoding, thereby displaying the GUI.

The above operation can be explained using the example mentioned above, where a first one of the compressed insert pictures comprises a picture depicting an unpressed button, and a second one of the compressed insert pictures comprises a picture depicting a pressed button. In this example, it is assumed that the background picture is displayed with the first insert picture incorporated into the background picture, wherein the first insert picture depicts an unpressed button. If user input is received to "press" the button depicted by the first insert picture, then in response the subscriber television pastes the second compressed insert picture into the compressed background picture, wherein the second compressed insert picture replaces the first compressed insert picture in the compressed background picture. The subscriber television then decodes and displays the background picture with the second insert picture incorporated into the background picture, wherein this displaying operates to display a pressed button. If the user later provides user input to depress the button, after having pressed the button, then in response the subscriber television pastes the first compressed insert picture back into the compressed background picture to again display an unpressed button.

Figure 8A:
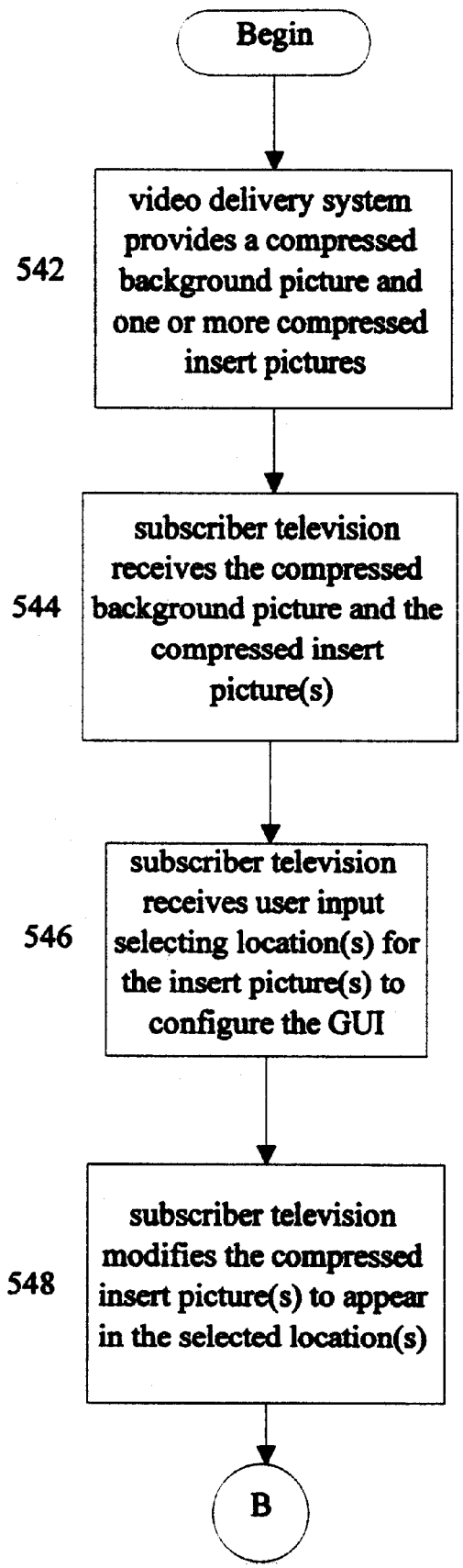
FIGS. 8A and 8B are a flowchart diagram illustrating an embodiment where the compressed background picture has a plurality of possible locations for insert pictures, and the user selects one or more of these locations for display of the insert pictures to configure the GUI.
Figure 8B:
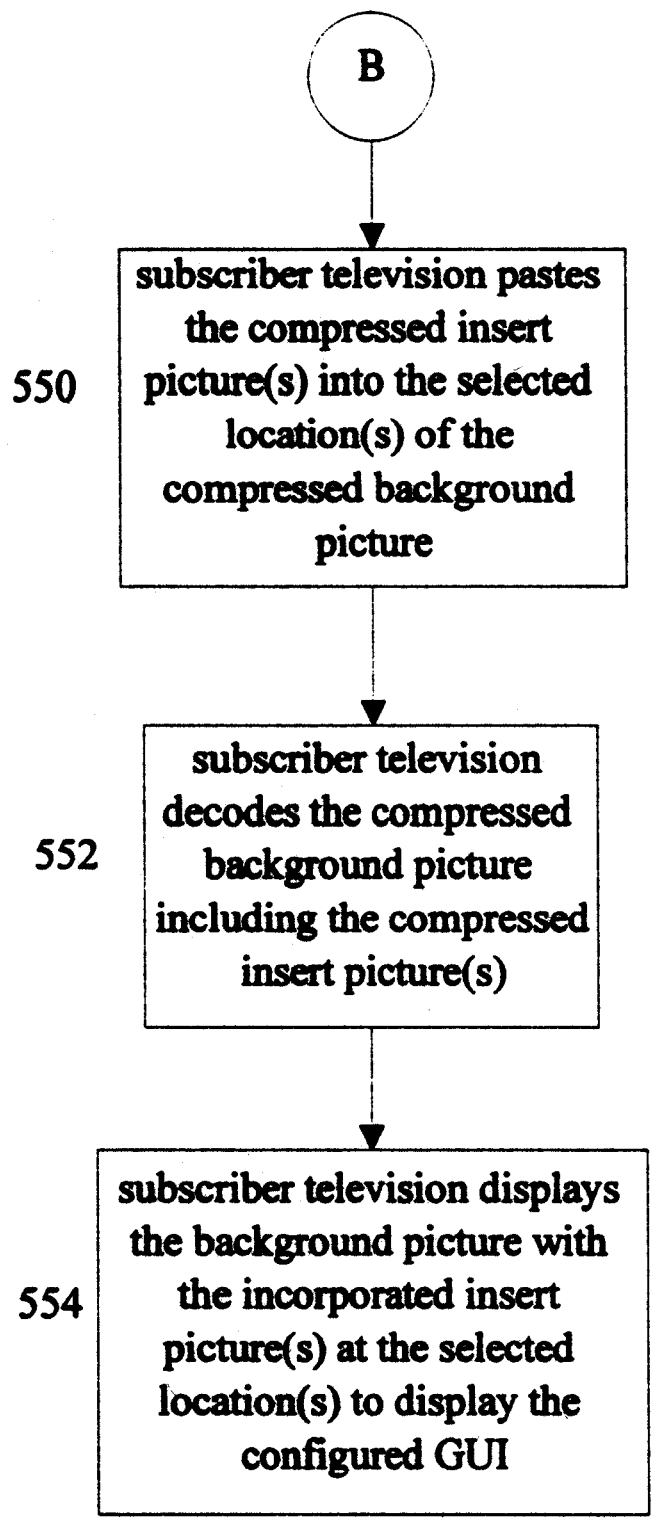

FIG. 8—User Configuration of the GUI by Selecting Positions for Insert Pictures FIGS. 8A and 8B are a flowchart diagram illustrating another embodiment of the invention. This embodiment is similar to the embodiment of FIG. 5, and includes a feature wherein the user or subscriber can select one or more locations in a background picture for display of one or more insert pictures. This feature enables the user to effectively configure his/her own GUI, including positioning of the various GUI elements or display portions, such as buttons, knobs, etc., in the desired positions.

In this embodiment, in step 542 the video delivery system provides a compressed background picture and one or more compressed insert pictures. The compressed background picture includes a plurality of locations where the one or more compressed insert pictures may be displayed. In step 544 the subscriber television receives the compressed background picture and the one or more compressed insert pictures.

In step 546 the subscriber television receives user input selecting one or more of the plurality of locations for display of the one or more compressed insert pictures. In step 548 the subscriber television modifies vertical and horizontal position data in the slices comprising the one or more compressed insert pictures to indicate the selected locations in the background picture.

In step 550 the method pastes the one or more compressed insert pictures into the selected location(s) of the compressed background picture. In step 552 the subscriber television decodes the compressed background picture including the one or more compressed insert pictures. In step 554 the subscriber television displays the background picture with the selected insert picture(s) incorporated into the background picture after the decoding. The background picture is displayed with the selected insert picture(s) located at the user selected location(s).

Figure 9:
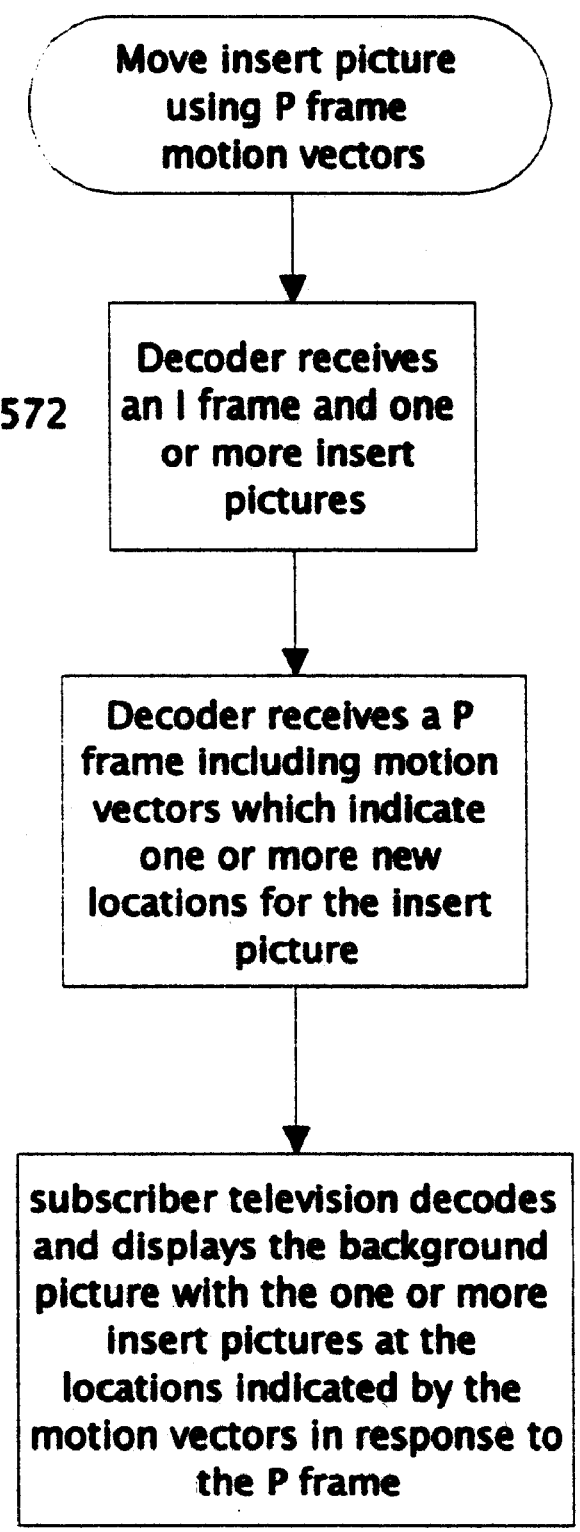
FIG. 9 is a flowchart diagram illustrating movement of insert pictures or GUI elements using P frame motion vectors.

FIG. 9—Moving GUI Insert pictures Using P Frames

The present invention also includes an improved method for moving insert images within the background image, i.e., movement of insert pictures to other locations on the screen. For example, the present invention can be used to move buttons or other GUI elements to other locations within the background image. This method utilizes one or more successive feeds of an appropriate P frame to the decoder, wherein the P frame includes motion vectors or translation vectors. The motion vectors indicate one or more new locations for the insert pictures, and the motion vectors cause the decoder to place one or more copies of the insert image or GUI element to the specified different locations on the screen.

FIG. 9 is a flowchart diagram illustrating operation of this method. As shown, in step 572 an I frame and one or more insert pictures are provided to the decoder as described above. As discussed above, this I frame method allows the application to patch or insert one or more sub-images or insert pictures on 16 pixel boundaries. Thus, the GUI base frame is provided as an I frame, and one or more insert pictures, preferably comprising GUI elements, are also received. In one embodiment, the display is not enabled when the I frame is received and thus the user does not see this base I frame.

In step 574 a P frame is transmitted which is received by the decoder. As mentioned above, the P frame includes motion vectors or translation vectors which operate to cause the decoder to place copies of the insert picture or GUI element in one or more locations on the screen, as indicated by the motion vectors. Thus the P frame is specially constructed to specify locations of the one or more insert pictures.

In step 576 the P frame motion vectors are executed and the display is enabled. Execution of the P frame causes the decoder to place the insert pictures in one or more locations, e.g., a multiple number of locations on the screen, as specified by the motion vectors. Thus, where a single insert picture has been provided, the P frame may be used to specify multiple locations within the background picture for display of the insert picture. For example, the P frame may be used to display a plurality of instances of this insert picture on the screen. The present invention may also be used to create a GUI with a "floating button" which appears to float or appear at different successive locations on the screen.

As another example of the use of this method, one or more I frames may be transmitted which include all of the channel/product logos or pictures for a given application. Synthesized P frames may then be subsequently transmitted which cause the correct elements or insert pictures to be viewable in the proper places on the screen based on user input to the application.

It is noted that this method may be subject to MPEG syntax limits. For example, the MPEG syntax allows macro blocks or pictures to move any distance horizontally but only ± 28 pixels vertically, i.e., ¼ screen in NTSC and approximately ⅕ screen in PAL.

Figure 10A:
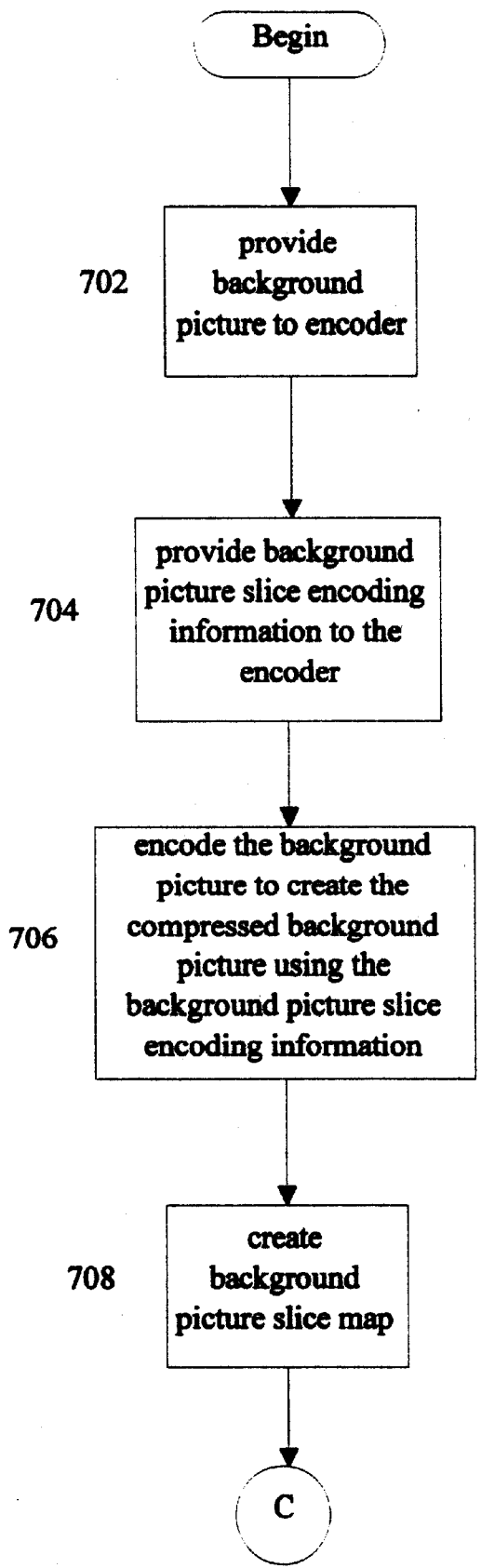
FIGS. 10A and 10B are a flowchart diagram illustrating creation of compressed background and insert pictures and corresponding slice maps.
Figure 10B:
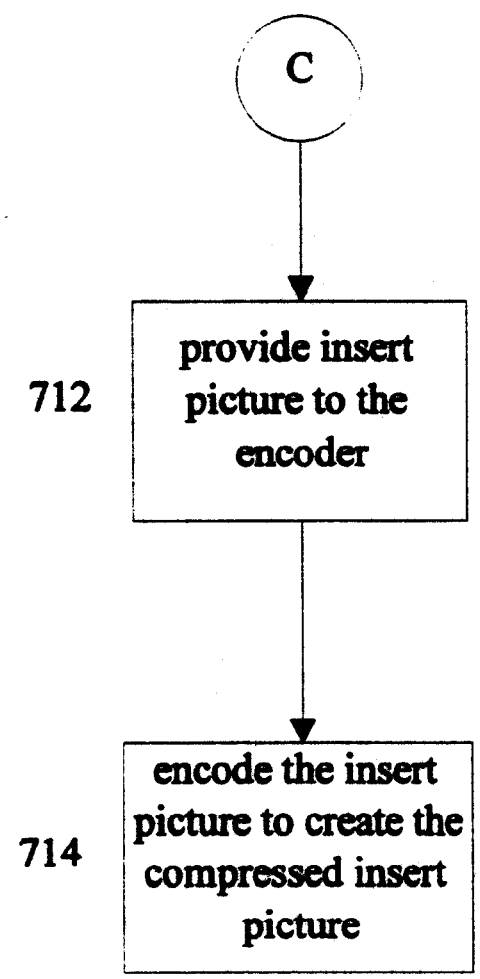

FIG. 10—Creation of the Compressed Background Picture and the Compressed Insert Picture Referring now to FIGS. 10A and 10B, a flowchart diagram illustrating creation of a compressed background picture and a compressed insert picture is shown. The flowchart of FIGS. 10A and 10B illustrates the operation of the video delivery system or cable head-end in creating the compressed background picture and one or more compressed insert pictures, as well as slice map information. In the preferred embodiment, the compressed background pictures and compressed insert pictures are MPEG compressed I (Intra) pictures.

In step 702 the method provides a background picture to an encoder. In step 704 the method provides background picture slice encoding information to the encoder. The background picture slice encoding information indicates one or more locations for the replacement slices. In other words, the background picture slice encoding information indicates the desired slice structure for the background picture to display one or more insert pictures at a desired location(s).

In step 706 the encoder encodes the background picture to create the compressed background picture. The encoding performed in step 706 uses the background picture slice encoding information to create the desired slice structure comprising one or more replacement slices at one or more locations in the compressed background picture. The encoding uses the background picture slice encoding information to place the one or more replacement slices in a position(s) where the insert picture is desired to appear. For example, if it is desired for the insert picture to be displayed at a first vertical position and a first horizontal position in the background picture, then the step of creating the compressed background picture comprises positioning the replacement slices in the compressed background picture at the first vertical position and the first horizontal position in the background picture.

Thus, steps 702–706 operate to create a compressed background picture, wherein the compressed background picture is created with a slice structure comprising a plurality of slices, and wherein the plurality of slices include one or more replacement slices located in a position(s) where the insert picture(s) is desired to appear. The one or more replacement slices in the compressed background picture are adapted to be replaced with one or more slices comprising the compressed insert picture.

In step 708 the method optionally creates a background picture slice map indicating a location of the replacement slices comprised in the compressed background picture. The step of creating the background picture slice map uses the compressed background picture. In the preferred embodiment, the background picture slice map comprises a plurality of byte offsets indicating locations of each of the slices in the compressed background picture. Creation of the background picture slice map preferably comprises determining the byte offsets into the background bitstream which point to the slice start codes in the compressed background picture.

In step 712 the method provides an insert picture to the encoder. In step 714 the method encodes the insert picture to create the compressed insert picture. The encoder preferably uses the background picture slice encoding information in encoding the insert picture in order to place the correct horizontal and vertical position data at the beginning of each slice in the compressed insert picture. In the above example, where the compressed background picture is created to display the insert picture at a first vertical position and a first horizontal position in the background picture, the step of creating the compressed insert picture comprises including vertical and horizontal position data in the one or more slices comprising the compressed insert picture, wherein the vertical and horizontal position data indicates the first vertical position and the first horizontal position Thus in step 712 the method creates the compressed insert picture, wherein the compressed insert picture comprises one or more slices, and wherein the one or more slices comprising the compressed insert picture are adapted to replace the one or more replacement slices in the compressed background picture.

In step 714 the method optionally creates an insert picture slice map indicating locations for the one or more slices comprising the compressed insert picture in the compressed background picture. In the preferred embodiment, the insert picture slice map comprises one or more byte offsets indicating locations of each of the one or more slices, preferably pointers to the slice start codes, in the compressed insert picture.

As noted above, the background picture slice map and the insert picture slice map are preferably created to aid the subscriber television in more easily incorporating the insert picture into the background picture. Where the background picture slice map and the insert picture slice map are not created and provided to the subscriber television, then the subscriber television is required to perform more processing to properly incorporate the insert picture into the background picture.

It is noted that the compressed background picture may be created with a slice structure adapted to include two or more insert pictures. For example, the step of creating the compressed background picture may comprise positioning first one or more replacement slices in the compressed background picture at a first vertical position and a first horizontal position in the background picture, and positioning second one or more replacement slices in the compressed background picture at a second vertical position and a second horizontal position in the background picture. In the above example, the background picture is created to include up to two insert pictures. If it is desired for this background picture to display two insert pictures at each of these first and second locations, then two compressed insert pictures are preferably created, with one compressed insert picture configured to be displayed at the first location, and the other compressed insert picture configured to be displayed at the second location. In the above example, if it is desired to provide the user or viewer with the choice of displaying an insert picture at either of the first or second locations, then one compressed insert picture is preferably created, with the compressed insert picture configured to be displayed at one of the locations. As discussed above with reference to step 548 of FIG. 8A, if the user or viewer selects a different location for the insert picture to appear, then the subscriber television is required to modify the location information in the compressed insert picture prior to decoding.

As noted above, a plurality of compressed insert pictures may be created, with each configured to appear at a different location. It is also noted that a plurality of compressed insert pictures may be created, with each configured to appear at the same location in a background picture. In this instance, when the compressed pictures are received by the subscriber television, then the user can select one of these insert pictures to appear in the background picture. Alternatively, as discussed above with respect to FIG. 9, subsequent P frames may be used to indicate or alter locations of compressed insert pictures.

Figure 11:
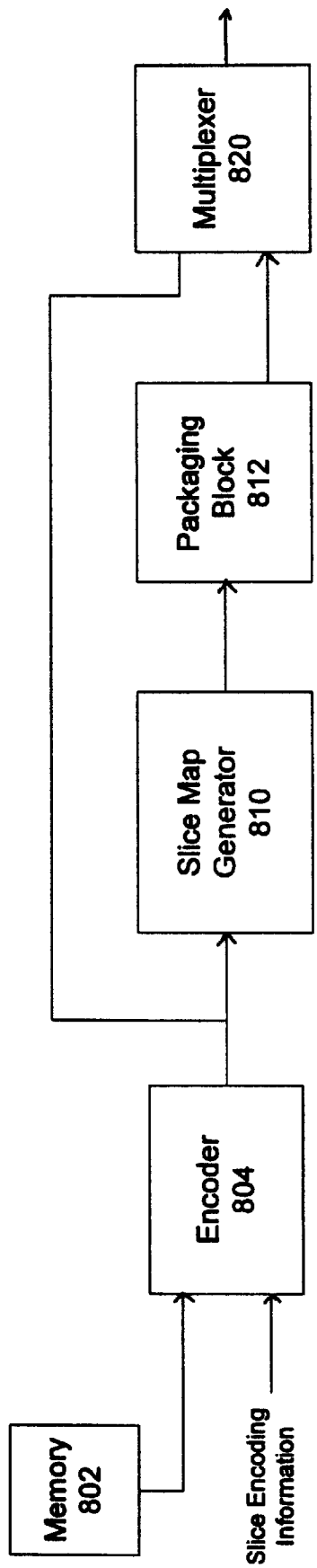
FIG. 11 is a block diagram of logic which creates compressed background and insert pictures and corresponding slice maps.

FIG. 11—Encoding Block Diagram

Referring now to FIG. 11, a block diagram illustrating a head-end system for encoding background and insert pictures for transmission to a decoder is shown. As shown, the system preferably includes a memory 802 which stores one or more background pictures and one more insert pictures. An encoder 804 is coupled to the memory 802. The encoder 804 includes an input which receives a bit stream sequence. The encoder also includes an input which receives slice encoding information. The encoder 804 outputs a compressed picture.

When a compressed background picture is to be created, the encoder 804 receives a background picture and also receives background picture slice encoding information. The encoder 804 uses the background picture slice encoding information to encode the background picture to create the compressed background picture. As noted above, the background picture slice encoding information indicates one or more locations for the replacement slices. As described above, the compressed background picture is created with the appropriate slice structure, including placement of the one or more replacement slices in position(s) where an insert picture is desired to appear.

When a compressed insert picture is to be created, the encoder 804 receives an insert picture and also preferably receives at least a portion of the background picture slice encoding information. The encoder 804 then encodes the insert picture to create the compressed insert picture. The background picture slice encoding information is used to include the correct position or location data in each of the slices of the created compressed insert picture. As described above, the one or more slices comprising the compressed insert picture are adapted to replace the one or more replacement slices in the compressed background picture.

The output of the encoder 804 is provided to the input of a multiplexer 820. The encoder output is also provided to a slice map generator 810. The slice map generator 810 operates to generate a slice map based on the received compressed picture. The slice map generator 810 coupled to the video encoder 804 receives the compressed background picture and operates to generate a background picture slice map based on the compressed background picture. The background picture slice map indicates locations of the slices in the compressed background picture. The background picture slice map preferably comprises a list of the byte offsets for each of the slices in the compressed background picture. The slice map generator 810 also receives the compressed insert picture and operates to generate an insert picture slice map based on the compressed insert picture. The insert picture slice map indicates locations, preferably byte offsets, of the slices in the compressed insert picture.

The slice map generator 810 provides an output to a packaging block 812. The packaging block 812 operates to pack the slice maps into interactive television modules. In the preferred embodiment, the packaging block 812 operates to pack the slice maps into OpenTV modules for transmission. Also, in the preferred embodiment, the compressed background and insert pictures are also packed into OpenTV modules. The output of the packaging block 812 is coupled to an input of the multiplexer 820. The multiplexer 820 operates to multiplex the compressed background picture, the compressed insert picture, and the slice map OpenTV modules. The output of the multiplexer 820 may be provided for further multiplexing with other data, such as other video streams, interactive application programs, etc.

The following example illustrates the operation of the video delivery system or cable head-end. First a background picture or image and insert picture or image are selected. The pictures have the correct dimensions, i.e., multiples of 16, with the insert picture being smaller than the background picture. Background picture slice encoding information is then created for the background picture bitstream, using the dimensions of the insert picture and its desired location in the background picture. The vertical and horizontal offsets into the background are also required to be multiples of 16.

A software encoder, which accepts the background picture slice encoding information, is used to encode the background picture. The insertion video sequence is also compressed, using the software encoder, with a row of macroblocks in each slice. Slice maps are then created for each of the compressed background picture and the compressed insert picture. Creation of the slice maps comprises determining the byte offsets into the bitstreams to point to the slice start codes in each picture.

A mutliplexed signal is then created comprising: a) an interactive application to perform the pasting operations; b) the background and insert picture bitstreams; and c) the slice maps or byte offsets into the background and insert bitstreams. This multiplexed stream can then be transmitted to one or more subscriber televisions.

Conclusion

Therefore, the present invention comprises and improved system and method for inserting one or more insert pictures into a background picture. The system and method of the present invention can be used to enable a user to selectively configure and/or interact with a graphical user interface (GUI) on the display screen of the subscriber television. In this embodiment, the video delivery system provides one or more background pictures, each with one or more insert pictures which can be displayed in the respective background picture. The insert pictures comprise images for the GUI, including buttons, dials, menus, etc. The user can then select various insert pictures for display, as well as the locations for display, in order to create the desired GUI. The user can also interact with the GUI, wherein the insert pictures are manipulated to reflect actions performed by the user.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for displaying graphical elements in a video system, wherein the video system comprises a video delivery system for providing video content, and at least one receiving device including a display screen, wherein the receiving device is coupled to the video delivery system, said method comprising:

the video delivery system:
providing a compressed background picture comprising a plurality of slices, wherein said plurality of slices includes a subset of one or more replacement slices configured to be replaced by slices of an insert picture, said replacement slices being positioned in the background picture where an insert picture is to appear; and
providing one or more compressed insert pictures, each said insert picture comprising one or more slices, and wherein at least one of said compressed insert pictures represents at least a portion of a graphical element;

the receiving device:
receiving said compressed background picture and said one or more compressed insert pictures;
decoding first slices of said plurality of slices of said background picture, responsive to determining said first slices are non-replacement slices;
discarding second slices of said plurality of slices of said background picture, responsive to determining said second slices are replacement slices;
decoding third slices corresponding to a first insert picture of said insert pictures; and
displaying said decoded first and third slices concurrently.

2. The method as recited in claim 1, further comprising the video delivery system:
providing a background picture slice map corresponding to the background picture; and providing at least one insert picture slice map corresponding to said one or more compressed insert pictures.

3. The method as recited in claim 2, wherein said receiving device is configured to utilize said background picture slice map and said insert picture slice map to decode said first slices, discard said second slices, and decode said third slices.

4. The method as recited in claim 1, wherein said first, second and third slices comprise MPEG slices.

5. The method as recited in claim 1, wherein said receiving device is configured to:
   scan the compressed background picture to determine which slices of said plurality of slices correspond to replacement slices; and
   scan the first insert picture to determine the slices of the first insert picture which are to be decoded in place of the replacement slices.

6. The method as recited in claim 1, further comprising:
   receiving user input corresponding to the graphical element;
   the subscriber television selecting a second insert picture of said insert pictures;
   the subscriber television decoding said first slices of said plurality of slices responsive to determining said first slices are non-replacement slices;
   the subscriber television discarding said second slices of said plurality of slices and decoding fourth slices corresponding to second insert picture, responsive to determining said second slices are replacement slices; and
   the subscriber television displaying said decoded first and fourth slices.

7. The method as recited in claim 6, wherein said graphical elements depict elements of a graphical user interface.

8. The method as recited in claim 1, further comprising:
   creating the compressed background picture, wherein the compressed background picture is created with a first slice structure adapted to include two or more insert pictures, and wherein creating the compressed background picture comprises positioning first one or more replacement slices in said compressed background picture at a first vertical position and a first horizontal position in said background picture, and positioning second one or more replacement slices in said compressed background picture at a second vertical position and a second horizontal position in said background picture; and
   creating the first compressed insert picture, wherein creating the first compressed insert picture comprises including vertical and horizontal position data in said one or more slices comprising said first compressed insert picture, wherein said vertical and horizontal position data indicates said first vertical position and said first horizontal position in said background picture;
   receiving user input selecting said first insert picture to appear at said second vertical position and said second horizontal position in said background picture;
   the receiving device modifying said one or more slices comprising said first compressed insert picture in response to receiving said user input, wherein said modifying comprises modifying said vertical and horizontal position data in said first compressed insert picture to indicate said second vertical position and said second horizontal position in said background picture;
   wherein the receiving device displaying said background picture with said first insert picture incorporated into said background picture comprises displaying said background picture with said insert picture appearing at said second vertical position and said second horizontal position in said background picture.

9. The method as recited in claim 1, wherein said compressed background picture and said one or more compressed insert pictures are MPEG compressed I pictures.

10. The method as recited in claim 9, further comprising receiving a P frame which indicates an alternate position for display of said first insert picture within said background picture.

11. The method as recited in claim 1, wherein said video system is a television system, said video delivery system is located at a head end of said television system, and said receiving device comprises a subscriber television receiving device.

12. The method as recited in claim 1, wherein said receiving device is coupled to said video delivery system via the Internet.

13. A video system which presents graphical elements, wherein the video system comprises:
   a video delivery system configured to provide video content, said video content comprising:
      a compressed background picture comprising a plurality of slices, wherein said plurality of slices includes a subset of one or more replacement slices configured to be replaced by slices of an insert picture, said replacement slices being positioned in the background picture where an insert picture is to appear; and
      one or more compressed insert pictures, each said insert picture comprising one or more slices, and wherein at least one of said compressed insert pictures represents at least a portion of a graphical element;
   at least one receiving device coupled to receive the video content from the video delivery system, wherein the receiving device is configured to:
      receive said compressed background picture and said one or more compressed insert pictures;
      decode first slices of said plurality of slices of said background picture, responsive to determining said first slices are non-replacement slices;
      discard second slices of said plurality of slices of said background picture, responsive to determining said second slices are replacement slices;
      decode third slices corresponding to a first insert picture of said insert pictures; and
      display said decoded first and third slices concurrently.

14. The system as recited in claim 13, wherein the video delivery system is further configured to:
   provide a background picture slice map corresponding to the background picture; and
   provide at least one insert picture slice map corresponding to said one or more compressed insert pictures.

15. The system as recited in claim 14, wherein said receiving device is configured to utilize said background picture slice map and said insert picture slice map to initiate decode of said first slices, discard said second slices, and decode said third slices.

16. The system as recited in claim 15, wherein said first, second and third slices comprise MPEG slices.

17. The system as recited in claim 13, wherein said receiving device is configured to:
   scan the compressed background picture to determine which slices of said plurality of slices correspond to replacement slices; and
   scan the first insert picture to determine the slices of the first insert picture which are to be decoded in place of the replacement slices.

18. The system as recited in claim 13, wherein the receiving device is further configured to detect user input corresponding to the insert picture and responsively:
   select a second insert picture of said insert pictures;
   decode said first slices of said plurality of slices responsive to determining said first slices are non-replacement slices;
   discard said second slices of said plurality of slices and decode fourth slices corresponding to second insert picture, responsive to determining said second slices are replacement slices; and
   display said decoded first and fourth slices.

19. The system as recited in claim 18, wherein said graphical elements depict elements of a graphical user interface.

20. The system as recited in claim 13,
   wherein the video delivery system is further configured to:
      create the compressed background picture with a first slice structure adapted to include two or more insert pictures, wherein first one or more replacement slices in said compressed background picture are positioned at a first vertical position and a first horizontal position in said background picture, and wherein second one or more replacement slices in said compressed background picture are positioned at a second vertical position and a second horizontal position in said background picture;
      create the first compressed insert picture with corresponding vertical and horizontal position data, wherein said vertical and horizontal position data indicates said first vertical position and said first horizontal position in said background picture;
   wherein the receiving device is further configured to:
      detect user input selecting said first insert picture to appear at said second vertical position and said second horizontal position in said background picture;
      modify said one or more slices comprising said first compressed insert picture in response to said user input, wherein said modifying comprises modifying said vertical and horizontal position data in said first compressed insert picture to indicate said second vertical position and said second horizontal position in said background picture; and
      cause the display of said background picture with said first insert picture incorporated into said background picture with said insert picture appearing at said second vertical position and said second horizontal position in said background picture.

21. The system as recited in claim 13, wherein said compressed background picture and said one or more compressed insert pictures are MPEG compressed I pictures.

22. The system as recited in claim 21, wherein the receiving device is further configured to:
   receive from the video delivery system a frame including one or more motion vectors corresponding to the first insert picture, wherein the motion vectors describe an alternate position for display of said first insert picture within the background picture; and
   initiate display of the background picture and the first insert picture with the first insert picture displayed at the alternate position.

23. The system as recited in claim 21, wherein said frame comprises a P frame.

24. The system as recited in claim 13, wherein said video system is a television system, said video delivery system is located at a head end of said television system, and said receiving device comprises a subscriber television receiving device.

25. The method as recited in claim 13, wherein said receiving device is coupled to said video delivery system via the Internet.

26. A receiving device for use in a video system, said device comprising:
   a receiver configured to:
      receive video content, wherein said video content includes a compressed background picture comprising a plurality of slices, wherein said plurality of slices include a subset of one or more replacement slices configured to be replaced by slices of an insert picture, said replacement slices being positioned in the background picture where an insert picture is to appear; and
      receive one or more compressed insert pictures, each said insert picture comprising one or more slices, and wherein at least one of said compressed insert pictures represents at least a portion of a graphical element;
   a decoder configured to decode video content;
   a memory coupled to said decoder which stores at least portions of one or more of said compressed background picture and said compressed insert picture; and
   a processing unit coupled to said memory, wherein said processing unit is configured to:
      decode first slices of said plurality of slices of said background picture, responsive to determining said first slices are non-replacement slices;
      discard second slices of said plurality of slices of said background picture, responsive to determining said second slices are replacement slices;
      decode third slices corresponding to a first insert picture of said insert pictures; and
      convey for concurrent display the decoded first and third slices.

27. The receiving device as recited in claim 26, wherein the video content further comprises a background picture slice map corresponding to the background picture and at least one insert picture slice map corresponding to said one or more compressed insert pictures, and wherein the processing unit is configured to utilize said background picture slice map and said insert picture slice map to decode said first slices, discard said second slices, and decode said third slices.

28. The device as recited in claim 27, wherein said first, second and third slices comprise MPEG slices.

29. The device as recited in claim 26, wherein said processing unit is configured to:
   scan the compressed background picture to determine which slices of said plurality of slices correspond to replacement slices; and
   scan the first insert picture to determine the slices of the first insert picture which are to be decoded in place of the replacement slices.

30. The device as recited in claim 26, wherein said video system is a television system, said video content is received from a broadcast station, and said receiving device comprises a subscriber television receiving device.

31. The device as recited in claim 30, wherein said graphical element depicts an element of a graphical user interface.

32. The device as recited in claim 26, wherein said device is coupled to receive said video content via the Internet.

* * * * *